Oct. 12, 1954 — H. J. SNELSON — 2,691,282
COOLING AND STORAGE APPARATUS FOR LIQUIDS
Filed June 21, 1949 — 3 Sheets-Sheet 2
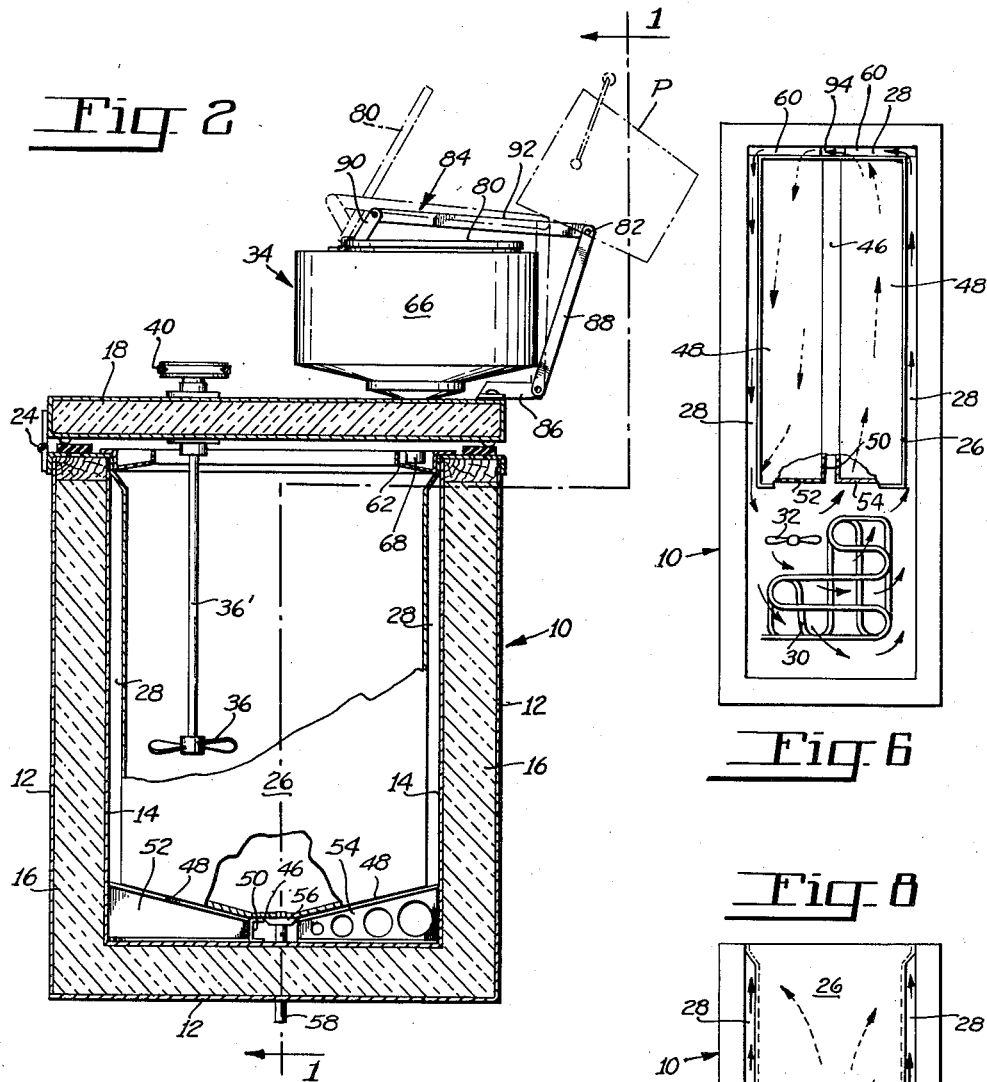
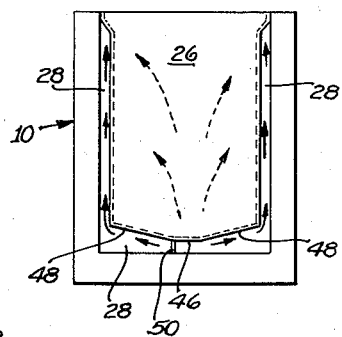
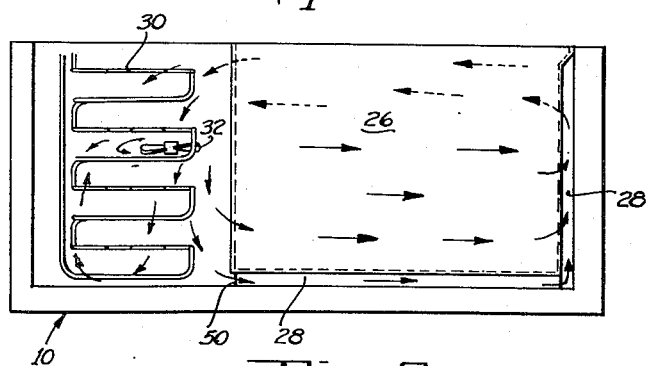
HOWARD J. SNELSON
INVENTOR.
REYNOLDS & BEACH
ATTORNEYS Oct. 12, 1954 H. J. SNELSON 2,691,282
COOLING AND STORAGE APPARATUS FOR LIQUIDS
Filed June 21, 1949 3 Sheets-Sheet 3
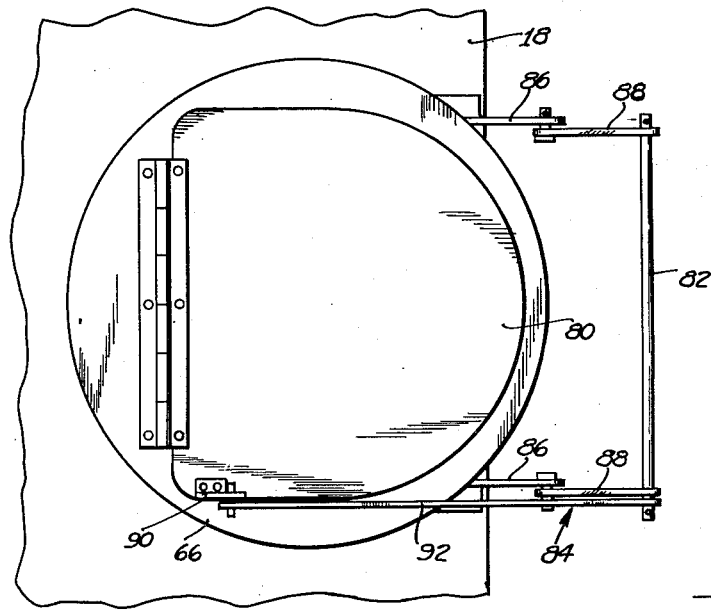
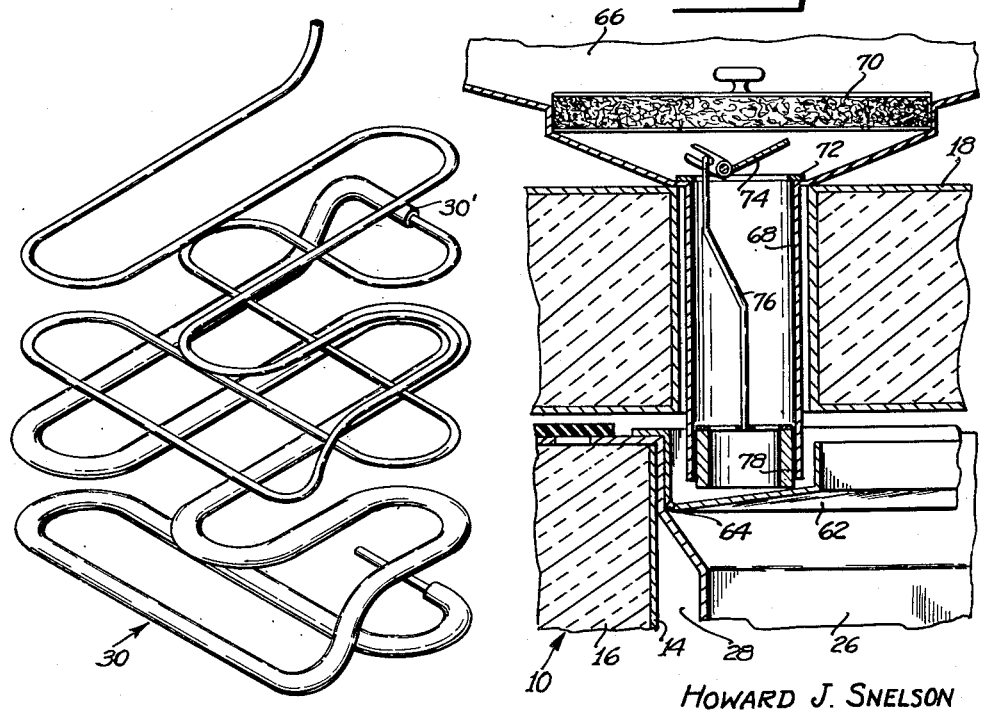
HOWARD J. SNELSON
INVENTOR.
REYNOLDS & BEACH
ATTORNEYS
BY Patented Oct. 12, 1954

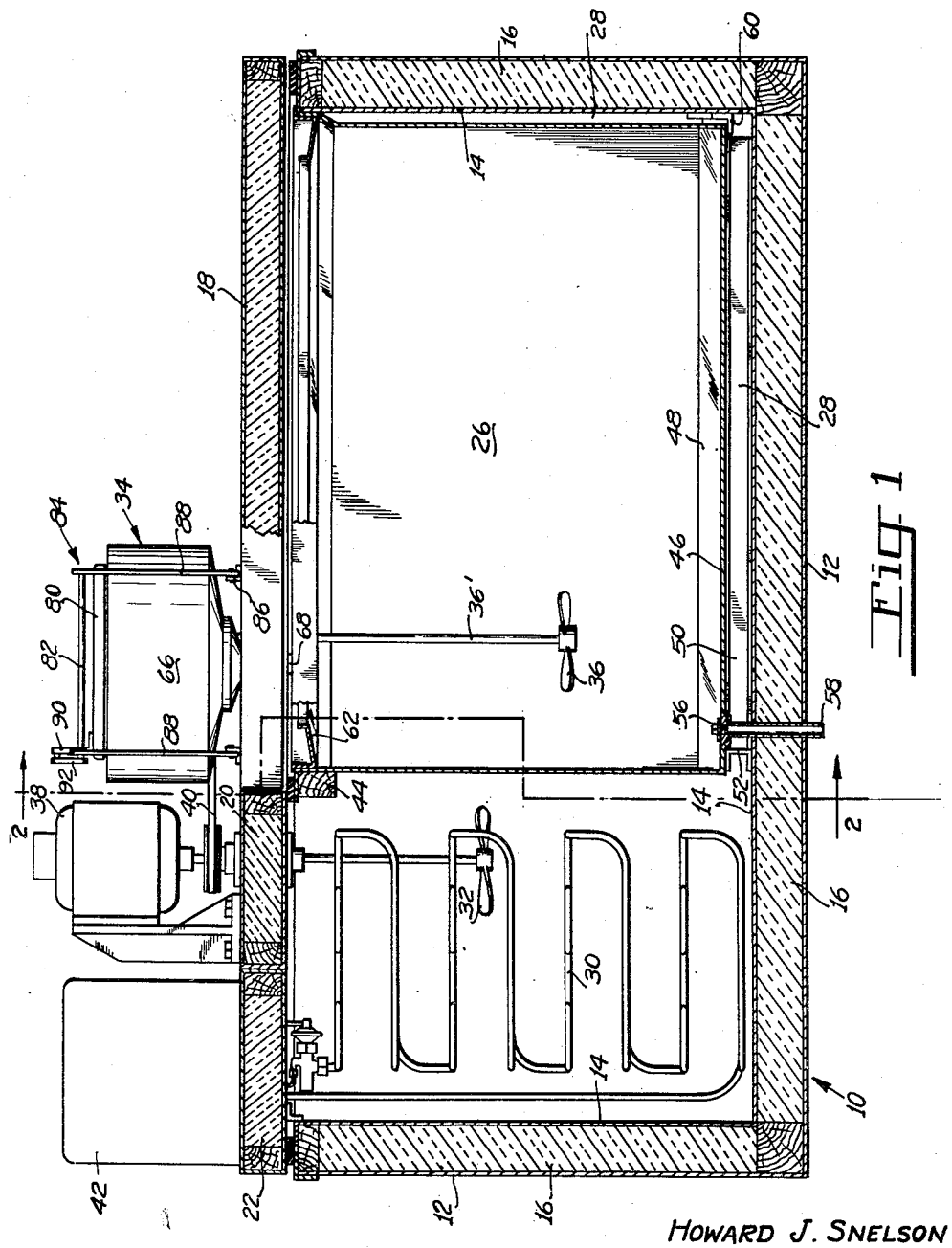

2,691,282

UNITED STATES PATENT OFFICE 2,691,282

COOLING AND STORAGE APPARATUS FOR LIQUIDS

Howard J. Snelson, Seattle, Wash., assignor of one-eighth to Lyell Jennings and one-eighth to Joseph Pasero, both of Paris, Ill.

Application June 21, 1949, Serial No. 100,329

4 Claims. (Cl. 62—158)

This invention relates to apparatus for cooling and storing liquids, and is herein illustratively described by reference to its preferred application, as a milk cooler and container. Fresh warm milk poured into such a cooler is cooled quickly to a temperature preferably below 50 degrees F., but above freezing, and is preferably also aerated to remove odors during the quick-cooling process. The cooled, aerated milk flows into a storage tank wherein it is maintained at a desired low temperature for as long as may be required.

The practice of cooling, aerating and storing milk in this general manner is useful particularly on farms producing for milk distributors who collect the milk at intervals for bottling. However, it is to be understood that the invention is not necessarily restricted to milk coolers, since it may apply as well to the cooling and storing of other liquids.

The general object of the invention is the provision of cooling and storage apparatus for liquids, which apparatus is generally more efficient, economical and satisfactory than those heretofore available. Such apparatus involves a storage tank around which cooling fluid, preferably cold water, is circulated to maintain the milk at an even low temperature.

A specific object is to provide in such apparatus a more efficient refrigeration coil of the ice accumulation type, between and around the convolutions of which the tank cooling liquid is circulated. The coil configuration should be such that cooling liquid circulation spaces between the coil convolutions are not readily obstructed by excessive accumulations of ice on the exterior of the tubing despite its large ice accumulating capacity, and yet the coil is formed compactly. Such accumulations of ice, less than an amount sufficient to obstruct tank cooling liquid flow, are desirable in order to increase the effective heat transfer or cooling area of the coil unit, enlarging its effective refrigeration capacity to handle peak total requirements of the apparatus, as when warm milk is being received and chilled. Because of the efficiency with which the milk tank cooling water is circulated around the coil the rate of heat removal from it by the ice is also high.

This coil constitutes a nest in the form of a bank of sinuous coil grids defining courses arranged in superposed parallel spaced relation and interconnected for passage of a refrigerant such as Freon gas in series through them. Each course of the refrigeration coil is formed as a grid composed of parallel straight lengths of tubing having alternate interconnecting loops at their ends to form a sinuous coil, and such straight lengths of the grids in adjacent layers are disposed mutually transversely, preferably at right angles. Thus, for instance, in one course the parallel straight tubing lengths of the coil grid may extend in series from front to rear of the cooler tank, whereas in the adjacent courses above and below the straight tubing lengths extend from side to side of the tank. With a coil of this configuration the cooling water must follow a tortuous path in circulating between and around its convolutions, extending the period of contact of the water with ice formed on the coil.

By virtue of the relative locations of the refrigeration coil and the milk storage tank, and the provision of effective baffles, the cooling fluid passing between the convolutions of the refrigeration coil flows by convection, with or without aid of an impeller, in a definite, closed course around the walls and bottom of the milk storage tank, to provide uniform cooling of such walls.

As a further feature of the invention the cooling and storage apparatus involves the arrangement of a cooling coil nest and a milk storage tank generally in the opposite ends, respectively, of a cooler tank. Cooperating with and located between the spaced tanks, partition means define a desired path for the flow of cooling fluid around the storage tank and through the coil nest to abstract heat uniformly from over substantially the entire wall area and bottom of the storage tank for dissipation by the refrigeration coil.

Still another object is the provision of a means to enable the milk to be poured into the storage tank more conveniently, including a distribution unit by which the milk is spread thinly over a cooling surface for chilling and aeration. Such means preferably comprises an outwardly accessible receiving tank communicating with an enclosed distribution trough mounted at the rim of the storage tank. A float valve in the trough automatically regulates the flow of milk into it from the receiving tank to insure that the capacity of the slowly draining trough is utilized but not exceeded.

These and other objects, features and advantages of the invention, including certain details of its preferred form, as herein illustrated, will now be described more fully by reference to the accompanying drawings.

Figure 1 is a longitudinal vertical sectional view of my improved apparatus for cooling and storing liquids, taken along line 1—1 of Figure 2.

Figure 2 is a transverse vertical sectional view of the apparatus taken on line 2—2 in Figure 1.

Figure 3 is an isometric view of the refrigerating coil unit.

Figure 4 is a vertical sectional detail view of the pouring means employed in the apparatus, parts thereof being broken away for convenience in illustration.

Figure 5 is a detail plan view of a portion of the apparatus including the pouring tank, and showing a convenient mechanism for opening its lid automatically when actuated by pressure applied by a milk bucket.

Figure 6 is a simplified plan view of the apparatus with parts broken away to show the general interior arrangement and circulatory flow of cooling fluid.

Figure 7 is a simplified longitudinal vertical sectional view of the apparatus showing the circulatory flow of cooling fluid; and Figure 8 is a simplified transverse vertical sectional view, presented for a similar purpose.

The bulk of the apparatus, including the storage tank, refrigeration coil unit and cooling liquid, is received within an insulated cabinet 10 preferably of rectangular shape (Figure 1). The sides and bottom of this cabinet are formed of an outer wall 12 and, spaced inwardly therefrom, an inner wall 14 which serves as a container for cooling liquid, and a packing of insulation material 16 filling the hollow space between these walls. The details of construction of the cabinet frame, etc., are more or less immaterial and therefore require no special description or illustration herein.

The cooler tank 14, or the cabinet generally, is covered by three successively adjoining insulated lids 18, 20 and 22, respectively, cooperating to form the entire top of the cabinet. These are likewise of double-walled insulated construction.

Each lid spans the entire width of the cabinet from front to rear, and the lid 18 extends over the major part of the total length of the cabinet, preferably about two-thirds thereof, and is mounted on hinges 24 along a long upper edge of the cabinet. This lid covers and is substantially coextensive in length with the milk storage tank 26 received in one end portion of the cabinet. Suitable spacing is left between the proximate end walls and the side walls of the two tanks, 14 and 26, and between their respective bottoms, to define a circulating space 28 for flow of cooling fluid around the storage tank 26. Lid 18, near its hinged edge, carries a milk receiving unit 34 and agitator means 36, which latter is used to mix the milk and cream uniformly in the storage tank before sampling for butterfat tests. The agitator shaft 36' is so located on the lid relative to the latter's hinge axis that, despite the length of such shaft, the stirrer will clear the forward edge of the storage tank as the lid is swung upward, as may be seen in Figure 2.

In the end portion of the cooler tank 14 opposite storage tank 26 are received a refrigeration coil unit 30 and cooperating cooling liquid impeller means 32 to be described. This open portion of the cooler tank is covered by the adjoining lids 20 and 22, neither of which is hinged to the upper edge of the cabinet, like the lid 18, but are individually removable from the top of the cabinet. The lid 20 carries the impeller 32, its electric drive motor 38, and pulley means for driving the agitator 36 from such motor through a disconnectable V-belt transmission 40. The impeller 32 is located on its lid so as to enable it to be removed with such lid for access to the refrigeration compartment containing the refrigeration coil unit 30. This may be done to enable such coil unit to be removed from the tank. The lid 22 carries the cooling coil unit 30 and associated refrigeration unit 42 for compressing the refrigerant and circulating it through the coil. Both units are removed by removal of the lid 22.

With this general arrangement in mind, attention may now be directed to details of the storage tank 26, milk receiving means 34 and quick-cooling and aerating means cooperating therewith.

A support beam 44 extends transversely across the top of the cabinet and may in part support the end of storage tank 26 adjacent to the refrigeration coil chamber by carrying its outwardly flanged upper edge. The remaining three edges of the storage tank are similarly flanged to overlie the upper edges of the cabinet's adjacent end wall and the side walls adjoining it, as shown. The bottom of the storage tank (Figure 2) is preferably trough-shaped, having a narrow horizontal mid-portion 46 extending longitudinally and sloping side portions 48 which incline therefrom upward and outward to join the opposite side walls of the storage tank as shown. A longitudinally extending channel iron member 50 underlies the flat portion 46 of the storage tank bottom to support the same from the bottom of the cooler tank 14. This channel iron member also acts as a partition dividing the circulation space between the tank bottoms. It terminates just short of the opposite ends of the storage tank 26, however, so that it will not block transverse flow of cooling fluid across the bottom of the cooler tank 14 beyond such ends.

At that end of the storage tank which adjoins the support beam 44 two tapered channel iron supports 52 and 54 extend transversely of the cooler tank 14 and support the end of the storage tank 26 by its bottom (Figure 2). The tapered channel support member 52 has a closed web and acts as a cooling fluid baffle, while the web of the channel member 54 is of open or apertured construction to pass a substantial proportion of the cooling fluid flowing transversely against it.

At the end of the storage tank 26 opposite the tapered channel support members 52 and 54 the storage tank bottom is supported by the inwardly directed flanges of angle iron brackets 60 secured to the end wall of the cooler tank 14. These flanges extend inwardly from the sides of the cooler tank to terminal locations near its central portion. At such location the terminals of the flanges are spaced apart, leaving a vertical opening 64, as shown in Figure 6, for flow of cooling fluid upward along the end wall of the storage tank.

The trough-bottomed storage tank 26 has a drain 56 and drain pipe 58 located centrally at one end, which is normally closed by a suitable plug and used in washing out the tank with clean water and disinfectant as may be necessary. Ordinarily milk will be removed from the storage tank by a suction hose, so that the tank need have no special milk outlet. It should be washed clean after each removal of milk therefrom, however.

As shown in Figures 1 and 2, and particularly in Figure 4, the open top of the storage tank 26 receives within it a milk distribution or spreader trough which preferably extends around its entire inside periphery and has an out-turned flange to overlap and rest upon the upper edge of the tank. The trough is narrow compared with the width of the storage tank, so that the central portion of such tank is left open and consequently is accessible for removing or inspecting the milk. When cleaning the tank this trough may be readily lifted out. The trough has an outwardly and downwardly sloping bottom which, at its junction with the outside vertical wall of the trough, has a series of small drain openings 64 extending around the entire closed length of the trough. Warm milk poured into the trough runs out through these openings and spreads in a thin film over the wall of the milk storage tank 26 immediately adjoining such apertures. Such milk is immediately chilled because the storage tank wall itself is kept constantly at a low temperature by cooling liquid in the outer tank, and, because the film is thin, such flow aerates the milk which removes odors.

Referring to the same three figures and also to Figure 5, the lid 18 carries a cylindrical pouring tank 66 the bottom of which funnels into a vertical spout 68 leading downward into the trough 62. A filter 70 is received in the bottom of the pouring tank 66 above the spout. The upper end of the spout is closed by an apertured partition 72 upon which pivots a valve 74, as shown in Figure 4. This valve regulates flow into the trough and is connected by a rod 76 to a float 78 received and guided for vertical movement in the lower end of the spout tube 68 and responsive to the level of milk in the spreader trough 62. As the level of milk in the trough rises progressively toward the maximum permissible level the valve 74 is moved correspondingly toward closed position to restrict the flow of milk from the tank 66 into the spout and hence into the trough. This prevents overflow of the trough and relieves the person pouring milk into the receiving tank 66 from gauging the capacity of the trough to prevent spilling. In a typical installation, the trough 62 may have a capacity of four gallons and the tank 66 several times that amount.

The top of the receiving tank 66 has a hinged cover 80 opened automatically by pressure of a milk pail against the control bar 82 acting through the linkage 84, as illustrated in Figure 2. A pair of spaced brackets 86 project forwardly from the front edge of the lid 18, as seen in Figure 2, and carry pivotally the lower ends of the upright links 88 between which the actuating rod 82 is connected for swinging inward toward the tank by pressure of a milk pail P pressed against it. A crank arm 90 projects upwardly from the side of the cover near its hinge axis and is interconnected pivotally by a generally horizontal link 92 with one end of the bar 82. As pressure is exerted by a milk pail on the bar it is swung toward the receiving tank 66, raising the cover into its broken line position shown in Figure 2. When the pail is emptied and withdrawn, releasing the bar the weight of the cover causes it to close.

The entire apparatus carried by the lid 18, including the pouring mechanism and the agitator mechanism, is readily swung with such lid clear of the storage tank for access to its interior.

As an important feature of the invention, the refrigeration coil unit 30 is of special configuration. It comprises a group of grids disposed in horizontal planes in vertically spaced relation. Each grid is composed of sinuous convolutions including parallel straight lengths of tubing interconnected in series by substantially semicircular loops. In adjacent grids the straight lengths extend mutually transversely, preferably at right angles, as shown best in Figures 3 and 6. The spacing between successive convolutions or straight tubing sections of a grid is approximately equal to the vertical spacing between successive grids in the group. Preferably the grids are connected in series and the refrigerant pumped through them from the refrigerating unit 42 mounted on the lid 22 as shown in Figure 1.

The coil unit may appropriately be termed an "ice nest" inasmuch as a layer of ice soon forms on the nest of tubing. I have found that an ice nest or refrigeration coil of the configuration shown and described herein particularly efficient for cooling the cooling water in such a system. The greater accumulation of ice on the tubing, permitted by this type of coil configuration without blocking the passages for flow of the cooling water through the spaces between the convolutions of the ice nest, provides an effectively larger heat exchange area to cool the water more rapidly. Moreover, because of the general symmetry of this coil configuration, in which the straight lengths of the sinuous coil grids are arranged mutually at right angles, cooling water passing between the grids and convolutions of the coil unit is effectively cooled thereby although it may enter the unit in different directions.

As shown in Figure 6, one corner of this grid group, namely an inner corner adjacent to the storage tank 26, by each grid including long and short straight lengths, is left open for reception of the impeller means 32, which comprises a propeller carried rotatively by the lower end of a vertical shaft driven by motor 36. The grid group thus forms an L-shaped ice nest.

The impeller is driven in such direction as to force the cooling liquid downward in the tank. This propulsion of the water causes it to pass through the apertures in the web of the tapered channel supporting member 54 shown in Figure 2 and also through the opening between the adjacent ends of the channel members 52 and 54 to flow longitudinally away from the ice nest compartment beneath approximately one-half of the storage tank 26 (Figures 6 and 7). Such water also passes upward along the corresponding side of the storage tank, as shown in Figures 7 and 8, moving in the same general longitudinal direction.

Some of the water flowing beneath the storage tank which reaches its remote end rises through the central opening 94 (Figure 6) between the adjacent ends of the tank's supporting brackets 60, mixing with water flowing along the side of the tank, and ultimately flows oppositely along the other side of the tank returning to the refrigeration coil compartment. The rest of the water flowing beneath the storage tank away from the refrigeration coil compartment completely circles the tank bottom, returning to the refrigeration coil compartment beneath most of the other half of the bottom as indicated by the broken arrows in Figure 6. As shown, the unperforated channel 52 diverts the outgoing flow so that it must move under and around one side of the tank. The longitudinal channel 50 partitioning the space between the tank bottoms restricts this outflow to the right side of the storage tank centerline as seen in Figure 6. Most of the water will therefore rise and completely encircle the tank before returning to the refrigeration coil compartment, although some may double back on the same side of the tank. The general flow back into such compartment swirls between the grids and convolutions of the refrigeration coil unit to lower the temperature of the cooling water before recirculation.

It is also important to note that the cooling system will function effectively, although at a reduced rate, even without the impeller in operation, by thermal circulation or convection flow in the cooler tank. This results from the fact that the water cooled in the open refrigeration compartment of the tank becomes more dense and settles to its bottom through the ice nest as it loses heat to the refrigeration coil unit. As this water settles it spreads out at the bottom, whereupon it passes beneath the storage tank 20 and to some extent around its sides along a path similar to that previously described. This water in flowing along the bottom, sides and end wall of the storage tank loses heat to it and thereby cools the milk contained therein. The water itself is thereby heated, rises and is drawn back into the refrigeration compartment of the tank to replace cooler water settling therein, or is forced back as a result of the rising thermal current along the storage tank walls. The unperforated channel 52 at the bottom and on the return-flow side of the cooler tank also causes the return flow to rise by diverting it upward in order to return to the refrigeration compartment. Consequently, a definite circulatory flow is established in the cooler tank 14 under all conditions of operation to maintain an even storage temperature in the storage tank.

In using the device, the refrigeration unit will be set into operation in advance of milking time in order to reduce the temperature of the cabinet to the desired value. Also a supply or coating of ice 30' will have been formed on the ice nest coil. As milk is poured into the receiving tank 66 and is cooled and aerated in flowing down the sides of the storage tank, the impeller 36 will be operated to insure rapid transfer of heat from the walls of the storage tank to the water in it. The water will be kept cool despite its rapid absorption of heat from the milk as it is circulated between the convolutions of the ice nest and melts the ice in it. When the storage tank is filled with milk at a uniformly cooled temperature, the impeller may be deenergized and the milk maintained at that storage temperature by the thermal or convection flow of the water alone, which will be kept sufficiently cool by the refrigerant flowing through the coil even though all the ice has been melted off the ice nest tubing during the initial chilling operation of the milk. The refrigeration unit will be controlled by a thermostat responsive to the thickness of the ice on the refrigeration coil so that such thickness does not exceed a desired value. The control details are conventional and therefore require no further explanation:

I claim as my invention:

1. A liquid cooling and storing apparatus comprising a cooler tank, a storage tank received within said cooler tank to define therebetween a space for cooling liquid, a shallow pan received within the upper portion of said storage tank and having restricted means for flow of liquid therefrom to said storage tank, cover means overlying said storage tank, a receiving receptacle above and mounted on said cover means, conduit means interconnecting said receiving receptacle and said pan, valve means movable to cover the upper end of said conduit, float means disposed below said conduit, means interconnecting said float means and said valve means and operable to move said valve means toward open position when said float means moves downward, and additional means interconnecting said float means and said valve means and operable to move said valve means toward closed position when said float means rises.

2. A liquid cooling and storing apparatus comprising a cooler tank, a storage tank received within said cooler tank to define therebetween a space for cooling liquid, a shallow pan received within the upper portion of said storage tank and having restricted means for flow of liquid therefrom to said storage tank, cover means overlying said storage tank, a receiving receptacle above and mounted on said cover means, conduit means interconnecting said receiving receptacle and said pan, valve means movable to restrict the upper end of said conduit, a float guided in the lower end of said conduit, and means interconnecting said float and said valve means and operable automatically in response to progressive upward movement of said float to close said valve means progressively as said float rises.

3. In liquid cooling and storing apparatus, a cooler tank containing cooling fluid, a refrigeration coil received in said cooler tank and including a stack of substantially horizontal L-shaped tubing grids arranged in vertical registry and parallel spaced relationship, each grid including a plurality of substantially straight parallel lengths of tubing, said straight tubing lengths in adjacent grids being disposed mutually perpendicular, and an impeller received in the angle of said L-shaped grid stack and operable to move the cooling fluid relative to said refrigeration coil.

4. Liquid cooling and storing apparatus comprising a cooler tank having an elongated interior space containing cooling fluid, a refrigeration coil received wholly within one end portion of said cooler tank interior space, a storage tank received within the opposite end portion of such space spaced longitudinally of the cooler tank from said refrigeration coil, and having the major portion of the bottom thereof spaced upward from the bottom of said cooler tank, elongated upright partition means dividing the space between the bottom of said storage tank and the bottom of said cooler tank, and extending generally longitudinally of said cooler tank and substantially throughout the length of said storage tank, at a location between the opposite sides of said cooler tank, said partition means defining a first channel for flow of cooling fluid beneath the bottom of said storage tank away from the location of said refrigeration coil and a second channel for return of cooling fluid to said refrigeration coil, a baffle extending transversely of the cooler tank beneath the bottom of that end of the storage tank adjacent to the refrigeration coil inwardly substantially from one side of the cooler tank across the second channel to said elongated upright partition means to divert cooling fluid upwardly from the return channel beneath the storage tank into the space between the tank side walls adjacent to and above said baffle.

References Cited in the file of this patent

UNITED STATES PATENTS

| Number | Name | Date |
| --- | --- | --- |
| 539,363 | Johnson | May 14, 1895 |
| 918,862 | Johnston | Apr. 20, 1909 |
| 1,222,170 | Wolf | Apr. 10, 1917 |
| 1,462,253 | Tobiasson | July 17, 1923 |
| 2,024,639 | Greene | Dec. 17, 1935 |
| 2,031,274 | McKay | Feb. 18, 1936 |
| 2,039,235 | Markley | Apr. 28, 1936 |
| 2,217,253 | Hughes | Oct. 8, 1940 |
| 2,253,882 | Achs | Aug. 26, 1941 |
| 2,386,889 | Furry | Oct. 16, 1945 |
| 2,446,763 | Haymond | Aug. 10, 1948 |